United States Patent
Rajagopalan et al.

(10) Patent No.: US 7,417,107 B2
(45) Date of Patent: Aug. 26, 2008

(54) COMPOSITIONS FOR USE IN GOLF BALLS

(75) Inventors: Murali Rajagopalan, South Dartmouth, MA (US); Shenshen Wu, North Dartmouth, MA (US); Manjari Kuntimaddi, Plymouth, MA (US); Shawn Ricci, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 150 days.

(21) Appl. No.: 11/162,538

(22) Filed: Sep. 14, 2005

(65) Prior Publication Data

US 2006/0009309 A1    Jan. 12, 2006

Related U.S. Application Data

(63) Continuation-in-part of application No. 10/656,704, filed on Sep. 5, 2003, now Pat. No. 6,989,422, and a continuation-in-part of application No. 10/900,471, filed on Jul. 28, 2004, now Pat. No. 7,214,738, which is a continuation-in-part of application No. 10/066,637, filed on Feb. 6, 2002, now Pat. No. 6,582,326, application No. 11/162,538, and a continuation-in-part of application No. 10/859,537, filed on Jun. 2, 2004, now Pat. No. 7,098,274.

(51) Int. Cl.
*A63B 37/12* (2006.01)
*C08G 18/62* (2006.01)

(52) U.S. Cl. .............................. 528/68; 528/60; 528/64; 528/65; 528/75; 473/378

(58) Field of Classification Search ............... None
See application file for complete search history.

(56) References Cited

U.S. PATENT DOCUMENTS

| | | | |
|---|---|---|---|
| 5,962,619 A | 10/1999 | Seneker et al. | |
| 5,965,681 A | 10/1999 | Schwindeman et al. | |
| 6,190,268 B1 | 2/2001 | Dewanjee | |
| 6,210,295 B1 | 4/2001 | Yoneyama | |
| 6,221,991 B1 | 4/2001 | Letchford et al. | |
| 6,235,819 B1 | 5/2001 | Lawson et al. | |
| 6,271,330 B1 | 8/2001 | Letchford et al. | |
| 6,350,723 B1 | 2/2002 | Mishra et al. | |
| 6,362,284 B1 | 3/2002 | Schwinderman et al. | |
| 6,435,986 B1 | 8/2002 | Wu et al. | |
| 6,486,261 B1 * | 11/2002 | Wu et al. ............... | 525/332.6 |
| 6,582,326 B2 | 6/2003 | Wu et al. | |
| 6,638,184 B2 | 10/2003 | Nesbitt et al. | |
| 6,638,185 B2 | 10/2003 | Kennedy, III et al. | |
| 6,645,091 B2 | 11/2003 | Wu et al. | |
| 6,648,777 B2 | 11/2003 | Kennedy, III et al. | |
| 6,699,027 B2 | 3/2004 | Murphy et al. | |
| 6,949,617 B2 | 9/2005 | Rajagopalan et al. | |
| 6,992,139 B2 * | 1/2006 | Rajagopalan ............... | 525/131 |
| 2003/0114246 A1 | 6/2003 | Yokota | |
| 2003/0203771 A1 | 10/2003 | Rosenberg et al. | |
| 2004/0048689 A1 | 3/2004 | Nesbitt | |
| 2004/0077434 A1 | 4/2004 | Matroni et al. | |
| 2004/0077435 A1 | 4/2004 | Matroni et al. | |
| 2004/0132545 A1 | 7/2004 | Kennedy, III et al. | |
| 2004/0225102 A1 | 11/2004 | Rajagopalan et al. | |
| 2005/0009640 A1 * | 1/2005 | Isogawa et al. ............. | 473/371 |
| 2005/0054798 A1 | 3/2005 | Klang et al. | |
| 2005/0054805 A1 * | 3/2005 | Rajagopalan ................ | 528/59 |
| 2005/0124777 A1 | 6/2005 | Rosenberg et al. | |

FOREIGN PATENT DOCUMENTS

CA    2212481    *    2/1998

* cited by examiner

*Primary Examiner*—David Buttner
(74) *Attorney, Agent, or Firm*—Mandi B. Milbank

(57) ABSTRACT

A golf ball having a core and at least one layer disposed about the core is disclosed. The at least one layer is formed from a composition having multiple reactive and/or non-reactive ingredients. At least one of these ingredients is a telechelic polydiene polyahl having a polydispersity of 1.35 or less.

4 Claims, No Drawings

COMPOSITIONS FOR USE IN GOLF BALLS

CROSS-REFERENCE TO RELATED APPLICATIONS

This application is a continuation-in-part of U.S. application Ser. No. 10/656,704, filed Sep. 5, 2003, now U.S. Pat. No. 6,989,422. This application is also a continuation-in-part of U.S. application Ser. No. 10/900,471, filed Jul. 28, 2004, now U.S. Pat. No. 7,214,738, which is a continuation-in-part of U.S. application Ser. No. 10/066,637, filed Feb. 6, 2002, now U.S. Pat. No. 6,582,326. This application is further a continuation-in-part of U.S. application Ser. No. 10/859,537, filed Jun. 2, 2004, now U.S. Pat. No. 7,098,274. Disclosures of these applications are incorporated herein by reference in their entirety.

FIELD AND BACKGROUND

The present disclosure is directed to compositions for use in golf ball that has superior resistance to water and moisture vapor in comparison to conventional materials, and golf balls formed from such compositions. One conventional material used to form golf ball covers is balata, a natural or synthetic trans-polyisoprene rubber. The softness of the balata cover allows the player to achieve spin rates sufficient to more precisely control ball direction and distance, particularly on shorter shots. However, balata covers lack the durability required by the average golfer, and are easily damaged. Accordingly, alternative cover compositions have been developed in an attempt to provide balls with spin rates and a feel approaching those of balata covered balls, while also providing a golf ball with a higher durability and overall distance.

Ionomer resins (e.g., copolymers of olefin, such as ethylene, and ethylenically unsaturated carboxylic acids, such as (meth)acrylic acids, wherein the acid groups are partially or fully neutralized by metal ions) have also been used as golf ball cover materials. Ionomer covers may be virtually cut-proof, but in comparison to balata covers, they display inferior spin and feel properties.

Polyurethanes and polyureas, by providing soft "feel," have also been recognized as useful materials for golf ball covers. However, conventional polyurethane covers do not match ionomer covers with respect to resilience or rebound. Unsaturated components (such as aromatic diisocyanate, aromatic polyol, and/or aromatic polyamine) used in a polyurethane or polyurea composition may at least in part attribute to the composition's susceptibility to discoloration and degradation upon exposure to thermal and actinic radiation, such as ultraviolet (UV) light. Conventional polyurethane covers can be prone to absorption of moisture, which is another mechanism through which desirable physical properties in the cover may be compromised. Moisture passed through the cover may further deteriorate physical and performance properties of the core.

Therefore, a continuing need remains for novel material compositions usable in forming golf ball portions (e.g., covers) having desirable and/or optimal combination of physical and performance characteristics, such as being hydrophobic and thus resistant to moisture absorption. Compositions comprising monodisperse telechelic polyhydrocarbons, such as those disclosed herein, have superior and desirable hydrophobicity and resistance to moisture absorption, and may be suitable for forming one or more portions of the golf ball.

SUMMARY

This disclosure is directed to a golf ball having at least a core and at least one layer (e.g., cover layer) disposed about the core. The core may have a diameter of 1 inch or greater. The at least one layer may have a thickness of 0.005 inches to 0.1 inches. The core may be a solid core having a compression of 40 to 100 or a coefficient of restitution of 0.7 or greater. The at least one layer may have a flexural modulus of 1,000 psi to 100,000 psi or a Shore D hardness of 90 or less. The golf ball may have a coefficient of restitution of 0.7 or greater. The golf ball may further comprise an intermediate layer disposed between the at least one layer and the core, or the golf ball may further comprise an outer cover layer disposed about the at least one layer.

The at least one layer may be formed from a composition comprising a telechelic polyahl. In one example, the composition may further comprise an isocyanate-containing prepolymer that is reactive to the telechelic polyahl. In another example, the composition may further comprise a polyisocyanate chosen from saturated polyisocyanates and aromatic polyisocyanates, and a curative that is compatible with the telechelic polyahl. In a further example, the composition may comprise an isocyanate-containing prepolymer formed from the telechelic polyahl and a polyisocyanate, the prepolymer having a viscosity at room temperature of 200 Pa·s or less and a % NCO of 15% or less. The prepolymer may further comprise a polyether polyahl or a polyester polyahl that is compatible with the telechelic polyahl. In a further example, the composition may form a polyurethane elastomer or a polyurea elastomer, and the telechelic polyahl may form soft segments in the elastomer.

The telechelic polyahl may have a polyhydrocarbon backbone that is free of aromatic unsaturations and is free of hydrolysable moieties. The telechelic polyahl may have a polydispersity of 1.35 or less, preferably 1.3 or less. In one example, the polyhydrocarbon backbone of the telechelic polyahl may be saturated. In another example, the polyhydrocarbon backbone may be a homopolymer of a conjugated diene having a 1,4-cis content of x, a 1,4-trans content of y, and a 1,2-vinyl content of z, where $x+y+z=100\%$. Preferably, $40\% \leq x$, or $40\% \leq y$, or $60\% \leq x$, or $z<20\%$, or any combination thereof. In a further example, the telechelic polyahl may comprise the same or different terminal isocyanate-reactive groups chosen from primary alkyl hydroxyl groups, primary allylic hydroxyl groups, secondary alkyl hydroxyl groups, primary alkyl amine groups, primary allylic amine groups, and secondary alkyl amine groups. In a further example, the telechelic polyahl may have a glass transition temperature of −30° C. or less and/or a viscosity at room temperature of 1 Pa·s to 100 Pa·s. In a further example, the telechelic polyahl may have a functionality of 1.6 to 2.3. In a further example, the telechelic polyahl has a functionality of 3 or greater. In a preferred example, the telechelic polyahl has one of the following structures, where $Y_1$ and $Y_2$ are the same or different radicals each having one or more isocyanate-reactive groups; $x+y+z=100\%$; and n is a number of 10 or greater.

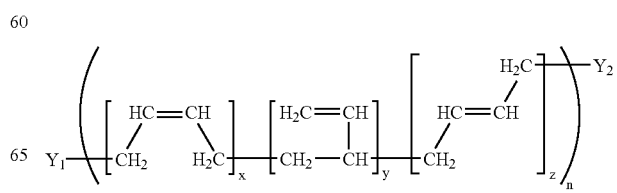

-continued

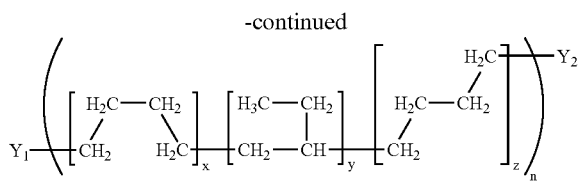

DETAILED DESCRIPTION

Broadly, the present disclosure is directed to golf balls comprising compositions formed at least in part from one or more telechelic polyahls having a polydispersity of 1.35 or less, preferably 1.3 or less (e.g., 1.26 to 1.23, or less), more preferably 1.2 or less, and most preferably 1.1 or less, with 1.0 being the theoretical minimum. The telechelic polyahis may preferably be liquid at ambient temperatures. In one example, the compositions further include at least one isocyanate and one or more additional reactants, and form thermoplastic, thermoset, castable, millable, or foamable (intumescent or swellable) reaction products that have urethane and/or urea linkages (e.g., polyurethanes, polyureas, poly(urethane-urea)s). In homotelechelic polyahls, the reactive end-groups may be hydroxyl groups (secondary, tertiary, preferably primary, or combination thereof) or amine groups (primary, preferably secondary, or combination thereof). In heterotelechelic polyahis, at least one of the reactive end-groups is amine or hydroxyl group (e.g., one being amine group and another being hydroxyl group). The telechelic polyahls may have an average hydroxyl or amine functionality of 1.6 or greater, preferably 1.8 or greater. The telechelic polyahls may further have additional hydroxyl and/or amine groups at the terminals, directly on the polymer backbone, on the branched side chains off the backbone, if any, and/or at the terminals of the branched side chains, if any. Any one or more of the secondary amine groups may in part form a single-ring or multi-ring heterocyclic structure. Preferred homotelechelic polyahls include $\alpha,\omega$-dihydroxy telechelics and $\alpha,\omega$-diamino telechelics; preferred heterotelechelic polyahis include $\alpha$-amino-$\omega$-hydroxy telechelics.

Amine or hydroxyl functionality of suitable telechelic polyahis may be chosen specifically for certain chemical reactivity and/or physical properties. In one example, the telechelic polyahls may have a low amine or hydroxyl functionality of 1.6 or greater, preferably 1.8 or greater, more preferably 1.9 or greater, further preferably 2.3 or less, further preferably 2.15 or less, further preferably 2.0 or less. In another example, the telechelic polyahs may have a mid-range amine or hydroxyl functionality of 2.4 or greater, preferably 2.9 or less, more preferably 2.6 or less. In a further example, the telechelic polyahls may have a high amine or hydroxyl functionality of 3 or greater, preferably 4 or greater, more preferably 10 or less, most preferably 6 or less. Telechelic polyahls having different amine or hydroxyl functionalities may be used singly or in combinations of two or more thereof. In one example, one, two, or more telechelic polyahls of low amine or hydroxyl functionalities may be used in a composition together with one, two, or more telechelic polyahls of mid and/or high amine or hydroxyl functionalities. The telechelic polyahls of different amine or hydroxyl functionalities may in a blend react with the isocyanate to form the prepolymer. Alternatively, the telechelic polyahis of low amine or hydroxyl functionalities may react with the isocyanate to form the prepolymer, and the telechelic polyahls of mid and/or high amine or hydroxyl functionalities may be used to cure the prepolymer.

Molecular weight of suitable telechelic polyahls is not particularly limiting. Typically, the telechelic polyahls may have a $M_n$ of 500 to 20,000, preferably 600 to 10,000, more preferably 800 to 5,000, further preferably 1,000 to 4,000, most preferably 1,500 to 3,500. One skilled in the art would understand that reaction products such as polyurethanes and polyureas may have a combination of soft segments and hard segments. Typically, soft segments are formed from telechelic polyahis that react with isocyanates to form isocyanate-containing prepolymers, and hard segments are formed from polyahls used as curatives that react with the prepolymers. Preferably, the telechelic polyahis of the present disclosure form at least in part the soft segments of the resulting reaction product. The hard segments of the resulting reaction product may or may not contain the telechelic polyahis of the present disclosure.

The backbones of the telechelic polyahls may be homopolymeric, random copolymeric, block copolymeric (e.g., di-block, tri-block), grafted copolymeric, or terpolymeric. Non-limiting examples of polymeric backbones include polyhydrocarbons (e.g., polyolefins), polyethers, polyesters (e.g., polycaprolactones), polyamides (e.g., polycaprolactams), polycarbonates, polyacrylates (e.g., polyalkylacrylates), polysiloxanes, polyimines, polyimides, and copolymeric ones like polyolefinsiloxanes (e.g., $\alpha,\omega$-dihydroxy poly (butadiene-dimethylsiloxane) and $\alpha,\omega$-dihydroxy poly(isobutylene-dimethylsiloxane)), polyetherolefins (e.g., $\alpha,\omega$-dihydroxy poly (butadiene-oxyethylene)), polyetheresters, polyethercarbonates, polyetheramides, polyetheracrylates, polyethersiloxanes, polyesterolefins (e.g., $\alpha,\omega$-dihydroxy poly(butadiene-caprolactone) and $\alpha,\omega$-dihydroxy poly (isobutylene-caprolactone)), polyesteramides, polyestercarbonates, polyesteracrylates, polyestersiloxanes, polyamideolefins, polyamidecarbonates, polyamideacrylates, polyamidesiloxanes, polyamideimides, polycarbonateolefins, polycarbonateacrylates, polycarbonatesiloxanes, polyacrylateolefins (such as $\alpha,\omega$-dihydroxy poly(butadiene-methyl methacrylate), $\alpha,\omega$-dihydroxy poly(isobutylene-t-butyl methacrylate), and $\alpha,\omega$-dihydroxy poly(methyl methacrylate-butadiene-methyl methacrylate)), polyacrylatesiloxanes, polyetheresteramides, any other copolymers, as well as blends one two or more of these polymers. Other telechelic polyahis can be derived from telechelic polyacids through reaction with polyols, aminoalcohols, cyclic ethers, cyclic esters, and/or cyclic amides, or derived from aminotelechelic polymers through reaction with hydroxy acids, cyclic esters, cyclic amides, and/or cyclic ethers. Examples of these and other telechelics include those described in the parent applications and in co-pending application Ser. No. 10/996,670, the disclosures of which are incorporated herein by reference in their entirety.

The backbone of the telechelic polyahls may have one or more hydrophobic and/or hydrophilic segments. The weight percentage of hydrophobic segments in the backbone is preferably 50% or less, more preferably 25% or less, further preferably 10% or less, and most preferably 5% or less. In one example, the backbone of the telechelic polyahis is free of hydrophilic segments. Such hydrophobic backbones are typically present in telechelic polyhydrocarbon polyahls, which may be formed from one, two, three, or more different monomers through radical polymerization, cationic polymerization, or preferably anionic polymerization. It is understood by one skilled in the art that different polymerization techniques typically result in different polymeric backbones having different microstructures (e.g., different distribution of 1,4-cis, 1,4-trans, and 1,2-vinyl contents). Even using the same polymerization technique; the microstructure of the resulting polymeric backbone may be different when the reaction conditions are altered, or different catalysts and/or reagents are used.

Monomers suitable for forming hydrophobic backbones of the telechelic polyahis include any and all monoenic and polyenic hydrocarbons (i.e., hydrocarbons having one, two, or more ethylenic unsaturations, like monoenes, conjugated and nonconjugated polyenes). In one example, the monomers that form the hydrophobic backbone are free of molecules having two or more independently polymerized vinyl groups (e.g., nonconjugated polyenic hydrocarbons such as 1,3-divinylbenzene and 1,4-divinylbenzene). In another example, the monomers that form the hydrophobic backbone are free of aromatic structures. In a further example, the monomers that form the hydrophobic backbone consist essentially of one or more conjugated polyenes such as conjugated dienes and/or one or more alkylenes. Non-limiting examples of conjugated polyenes include 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene.

Polyhydrocarbon (e.g., poly(alkylene-diene), homopolydiene, copolydiene) backbones may be substantially unsaturated, which allow radical-initiated crosslinking through the ethylenic unsaturations in the presence of free radical initiators and optional crosslinking agents (e.g., those disclosed in the parent applications). These unsaturated polyhydrocarbon backbones may be partially or fully hydrogenated to improve their stability and weatherability of the resulting compositions. The degree of hydrogenation may be at least about 70%, preferably at least about 90%, more preferably at least about 95%, most preferably at least about 99%. Non-limiting examples of polyhydrocarbon backbones include polyolefins (e.g., polyethylenes, polypropylenes, polyethylenepropylenes, polyisobutylenes, polyethylenebutylenes (with butylene content of at least about 25% by weight, preferably at least about 50%), Kraton® rubbers), polydienes (e.g., polyisoprenes, polyisoprenes, polybutadienes), and poly(olefindiene)s (e.g., poly(styrene-butadiene) s, poly(ethylene-butadiene)s, and poly(butadiene-styrene-butadiene)s).

In one example, the telechelic polyahls having polyhydrocarbon backbones may be substantially free of hydrolysable moieties (e.g., ether or ester linkages), and include telechelic polyahls having unsaturated homopolymers of conjugated dienes (e.g., 1,3-butadiene) as the backbones. The backbones may be branched, but preferably substantially linear. The homopolymer backbones have a 1,4-cis content of x, a 1,4-trans content of y, and a 1,2-vinyl content of z, where x+y+z=100%. The value of x may be 0% or greater, preferably 1% or greater, more preferably 3% or greater, even preferably 5% or greater, further preferably 10% or greater, further preferably 15% or greater, further preferably 20% or greater, further preferably 25% or greater, further preferably 40% or greater, further preferably 50% or greater, further preferably 60% or greater, further preferably 80% or greater, further preferably 90% or greater, further preferably 95% or greater, further preferably 98% or greater, further preferably 99% or greater. Alternatively, the value of x may be 100% or less, preferably 95% or less, more preferably 90% or less, even preferably 85% or less, further preferably 75% or less, further preferably 60% or less, further preferably 50% or less, further preferably 40% or less, further preferably 30% or less. The value of x may further preferably be in a range between two of the values disclosed above. The value of y may be 0% or greater, preferably 1% or greater, more preferably 3% or greater, even preferably 5% or greater, further preferably 10% or greater, further preferably 15% or greater, further preferably 20% or greater, further preferably 25% or greater, further preferably 40% or greater, further preferably 50% or greater, further preferably 60% or greater, further preferably 80% or greater, further preferably 90% or greater, further preferably 95% or greater, further preferably 98% or greater, further preferably 99% or greater. Alternatively, the value of y may be 100% or less, preferably 95% or less, more preferably 90% or less, even preferably 85% or less, further preferably 75% or less, further preferably 60% or less, further preferably 50% or less, further preferably 40% or less, further preferably 30% or less. The value of y may further preferably be in a range between two of the values disclosed above. The value of z may be 0% or greater, preferably 20% or greater, more preferably 30% or greater, even preferably 40% or greater, further preferably 50% or greater, further preferably 65% or greater, further preferably 70% or greater, further preferably 75% or greater, further preferably 80% or greater, further preferably 90% or greater. Alternatively, the value of z may be 100% or less, preferably 95% or less, more preferably 90% or less, even preferably 85% or less, further preferably 75% or less, further preferably 65% or less, further preferably 60% or less, further preferably 55% or less, further preferably 50% or less, further preferably 40% or less, further preferably 30% or less, further preferably 20% or less, further preferably 15% or less, further preferably 10% or less, further preferably 5% or less, further preferably 3% or less, further preferably 1% or less. The value of z may further preferably be in a range between two of the values disclosed above. Without being limited to any particular theory, it is believed that telechelic polydiene polyahls having higher 1,4-cis and/or 1,4-trans contents are better suited for use in golf balls. In one example, $x+y \geqq 0.08$, preferably $x+y \geqq 0.35$. In another example, $x+y \leqq 0.77$, preferably $x+y \leqq 0.35$.

The terminal isocyanate-reactive groups of the telechelic polydiene polyahis may be primary alkyl hydroxyl groups, primary allylic hydroxyl groups, secondary alkyl hydroxyl groups, primary alkyl amine groups, primary allylic amine groups, secondary alkyl amine groups, or combinations of two or more thereof. The telechelic polydiene polyahls may have a glass transition temperature of −30° C. or less, preferably −40° C. or less, more preferably −50° C. or less, further preferably −70° C. or less, most preferably −75° C. or less. The telechelic polydiene polyahls may have a viscosity at room temperature of 1 Pa·s to 100 Pa·s. Suitable hydroxyl-terminated polydienes may have an OH value of 0.1 meq/g to 2 meq/g.

Also preferred telechelic polyhydrocarbon polyahls are partially or fully hydrogenated species of the telechelic polydiene polyahls described above. The degree of hydrogenation may be at least 40%, preferably 70% or greater, more preferably 80% or greater, further preferably 90% or greater, further preferably 95% or greater, further preferably 98% or greater, further preferably 99% or greater. In one example, substantially all of the 1,2-vinyl microstructures, if any, are preferably hydrogenated. Non-limiting examples include polyisoprene diols having 1,4-addition of at least 80%.

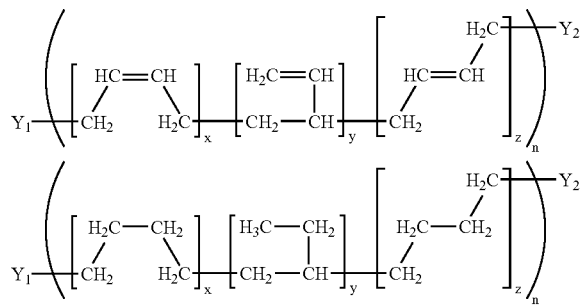

Preferred telechelic linear polybutadiene polyahls being unsaturated, partially hydrogenated, or fully hydrogenated may have the general structures illustrated above, Where $Y_1$ and $Y_2$ are the same or different radicals each having one or more isocyanate-reactive groups (e.g., hydroxyl groups and/or amine groups), like —OH, —$NH_2$, or —NHR where R is $C_{1-20}$ radical; x, y, and z are numbers as described above; and n is the degree of polymerization, which is a number of 10 or greater, preferably 20 or greater, more preferably 25 or greater, further preferably 50 or greater, typically 500 or less, preferably 200 or less, more preferably 100 or less. At least one of the values of x and z may be greater than 0%, preferably both being greater than 0%, and the value of y may be 0% or greater. In one example, $6.5 \leq (x+z) \cdot n \leq 39.5$. In another example, $12 \leq y \cdot n \leq 72$. The telechelic polybutadiene polyahls (unhydrogenated, partially hydrogenated, or fully hydrogenated) may have any functionality as described above, but preferably have a low functionality of 1.8 to 2.3, more preferably be free of species with functionality higher than 2. Non-limiting examples include polybutadiene diols having 1,4-addition of 30% to 70%, preferably 40% to 60%. The polybutadiene diol can be more than about 99% hydrogenated, having a $M_n$ of 3,300, a hydroxyl functionality of 1.92, and a 1,2-addition content of 54%.

In forming the compositions of the present disclosure, the telechelic polydiene polyahls may be used as a non-reactive component. That is, the composition is substantially free of ingredients that are capable of reacting with the telechelic polydiene polyahls, such as isocyanates. Alternatively, the telechelic polydiene polyahls may be used in a reactive, preferably liquid, composition where the telechelic polydiene polyahls react with one or more other ingredients by forming organic linkages (e.g., urethane, urea, ester, amide). In one example, the reactive composition comprises one, or a blend of two or more, of the telechelic polydiene polyahls, an isocyanate or a blend of two or more isocyanates, and optionally a curative (e.g., polyahls). The telechelic polydiene polyahls may form one or more hard segments of the resulting material (e.g., polyurethanes, polyureas) when the isocyanate is an isocyanate-containing prepolymer formed from a polyisocyanate and a polyahl. Preferably, the telechelic polydiene polyahls may form one or more soft segments of the resulting material by reacting with a polyisocyanate to form an isocyanate-containing prepolymer. Such prepolymers may have a low viscosity at room temperature of 200 Pa·s or less, preferably 120 Pa·s or less, more preferably 100 Pa·s or less, further preferably 50 Pa·s or less, further preferably 25 Pa·s or less, further preferably 5 Pa·s or less. Non-limiting ranges of viscosity include 0.5 Pa·s to 3 Pa·s, 0.7 Pa·s to 1.7 Pa·s, 12 Pa·s to 22 Pa·s, and 70 Pa·s to 95 Pa·s. Such prepolymers may have a % NCO of 15% or less (e.g., 10.9% to 12.1%), preferably 10% or less (e.g., 8% to 9.7%, 6% to 9%), more preferably 7.5% or less (e.g., 4% to 5%), but not less than 2% (e.g., 2.1% to 3.2%, 2.7% to 4.2%). Combination of low % NCO and low isocyanate functionality in the prepolymer (e.g., 2.5 or less) may render the prepolymer difficult to process. In such situations, plasticizers like soybean oil, dioctylphthalate, and other phthalates may be blended with the prepolymer to reduce viscosity.

The telechelic polydiene polyahls may be used singly or in blends of two or more thereof when forming the isocyanate-containing prepolymer. Preferably, one or more of the telechelic polydiene polyahls may be blended with one or more other telechelic polyahls (e.g., polyether polyahls, polyester polyahls) prior to reacting with the polyisocyanate. Suitable telechelic polyahls to blend with the telechelic polydiene polyahls are preferably compatible telechelic polyahls having a polarity no greater than that of polyoxyethylene polyahls. In such blends, the weight ratio of the telechelic polydiene polyahls to the compatible telechelic polyahls depends on the miscibility of the telechelic polyahls, and may be 10:1 or less (e.g., polyoxypropylene polyahls, particularly those having a $M_n$ of 2,000 to 3,000), preferably 5:1 or less, more preferably 4:1 or less (e.g., dimer diols and dimer diamines disclosed in the parent applications), even preferably 3:1 or less, further preferably 2:1 or less (e.g., polytetramethylene ether glycols, polyoxytetramethylene diamines), further preferably 1:1 or less.

Non-limiting examples of polyisocyanates (including diisocyanates) for use in the compositions of the present disclosure include those disclosed in the parent applications. In one example, saturated polyisocyanates (including aliphatic and cycloalipahtic polyisocyanates) are preferred for enhanced weatherability. In another example, aromatic polyisocyanates, particularly those that are free of non-aromatic unsaturations, are preferred for forming highly resilient materials (e.g., having a percentage of rebound of 60% or greater). To form thermoplastic materials, diisocyanates and uretdiones of diisocyanates are preferred choices. To form thermoset materials, higher polyisocyanates such as triisocyanates, tetraisocyanates, biurets and isocyanurates of diisocyanates are preferred.

Non-limiting examples of curatives, especially polyahls, for use in the compositions of the present disclosure include those disclosed in the parent application. In one example, short chain polyahls (liquid or solid at room temperature) that are compatible with the telechelic polydiene polyahls are preferred curatives, used singly or in blends of two or more thereof. Non-limiting examples include 2-ethyl-1,3-hexanediol, N,N-diisopropanolaniline, 2,2,4-trimethyl pentane-1,3-diol, 4,4'-methylenebis(3-chloro-2,6-diethyl)aniline, tetra(2-hydroxypropyl) ethylenediamine, polyoxypropylene polyahls having a $M_w$ of 500 or less, polyoxytetramethylene polyahls having a $M_w$ of 1,000 or less, dimer diols, dimer diamines, diols and polyols having at least one primary OH group that is one carbon atom away from a tertiary or quaternary carbon atom. When a curative that is incompatible with the telechelic polydiene polyahl is used, the incompatible curative may be used in an amount of 10 phr or less by weight of the telechelic polydiene polyahl (e.g., 6.5 phr or less for 1,4-butanediol). In another example, preferred curatives include polyfunctional (e.g., tri-functional, tetra-functional) polyols.

Additional curatives that are compatible with the telechelic polydiene polyahls include polyahls having a linear or branched polyhydrocarbon backbone. In one example, the curative polyahls have a hydroxyl or amine functionality of greater than 2, preferably 3 or greater, more preferably 4 or greater, and a $M_n$ of 5,000 or less, preferably 2,500 or less. In another example, the curative polyahls are the telechelic polydiene polyahls described above, and their derivatives having a higher hydroxyl or amine functionality of greater than 2, such as those derived by radical addition of 2-sulfanylethan-1-ol (initiated by 2,2'-azobis(isobutyronitrile)) to 1,2-vinyl moieties on the telechelic polydiene polyahls. Such derived high functionality telechelic polydiene polyahls may maintain a low polydispersity of 1.35 or less, preferably 1.3 or less, more preferably 1.26 or less.

The materials formed from the compositions comprising at least the telechelic polydiene polyahl, the polyisocyanate, and the optional curative may be used to form one or more portions (e.g., thin barrier layers, inner and/or outer cover layers) of the golf ball, utilizing some or all of the enhanced properties. At least some of these materials may have a low moisture vapor transmission rate (MVTR) of 0.1 g·mm/(m day) or less, preferably 0.05 g·mm/($m^2$·day) or less, more preferably 0.036 g·mm/($m^2$·day) or less, further preferably 0.01 g·mm/($m^2$·day) or less. At least some of these materials may have a low glass transition temperature of $-30°$ C. or less, preferably $-35°$ C. or less, more preferably $-40°$ C. or less, further preferably $-45°$ C. or less, further preferably $-50°$ C. or less, further preferably $-70°$ C. or less. The materials may have 15 weight percent to 50 weight percent of hard segments by weight of the material. The material may have a percentage of rebound of 60% or greater, especially when filled with ground rubber (e.g., polybutadiene rubber) particles sized 1 mm to 4 mm. Other desirable properties include good abrasion resistance, low surface tension, good hydrolytic stability, good weatherability, and capability of oxidative crosslinking. When use as a barrier layer disposed between an outer cover layer and an inner core, or as a coating layer disposed about the outer cover layer, the composition may be formulated additionally with one or more vinyl monomers, one or more polyfunctional (meth)acrylates, and/or one or more vinyl functional urethane oligomer, and use free radical initiation and heat cure.

A variety of additives can optionally be incorporated into the compositions of the present disclosure, or any one or more of the subcomponents thereof. These additives include, but are not limited to, catalysts to alter the reaction rate, fillers to adjust density and/or modulus, processing aids or oils (such as reactive or non-reactive diluents) to affect rheological and/or mixing properties, reinforcing materials, impact modifiers, wetting agents, viscosity modifiers, release agents, internal and/or external plasticizers, compatibilizing agents, coupling agents, dispersing agents, crosslinking agents, defoaming agents, surfactants, lubricants, softening agents, coloring agents including pigments and dyes, optical brighteners, whitening agents, UV absorbers, hindered amine light stabilizers, blowing agents, foaming agents, and any other modifying agents known or available to one of ordinary skill in the art. One or more of these additives may be used in amounts sufficient to achieve their respective purposes and desired effects. Non-limiting examples of such additives and their appropriate amounts are disclosed in the parent applications.

Conventional materials used for golf ball covers, intermediate layers, and cores may be blended with the compositions of the present disclosure, by about 1 weight percent to about 95 weight percent of the composition. Non-limiting examples of such materials are disclosed in the parent applications. Preferably, a thermoplastic composition of the present disclosure is used, optionally in a blend with one or more conventional thermoplastic materials.

The golf ball cover layer or at least one sub-layer thereof (e.g., inner cover layer, outer cover layer) may preferably be formed from one of the compositions disclosed herein. The cover layer can have a thickness from 0.001 inches to 0.125 inches, preferably from 0.005 inches to 0.1 inches, more preferably from 0.01 inches to 0.05 inches, most preferably from 0.015 inches to 0.04 inches, like 0.035 inches. Alternatively, the thickness of the cover layer is 0.5 inches or less, preferably 0.05 inches to 0.2 inches, more preferably 0.05 inches to 0.1 inches. The cover layer may have a flexural modulus of 1,000 to 100,000 psi, preferably 1,000 psi to 80,000 psi, more preferably 1,000 to 50,000 psi, even preferably 1,000 psi to 30,000 psi, most preferably 2,000 psi to 25,000 psi, alternatively 10,000 psi to 80,000 psi. The Shore D hardness of the cover layer may be 90 or less, preferably 20 to 70, more preferably 20 to 60, further preferably from 25 to 55, even preferably from 30 to 55, most preferably from 40 to 55. The cover layer may preferably have a WVTR of about 2 g/($m^2$(day) or less, The core of the golf ball may be solid, fluid-filled, gel-filled, or gas-filled, having a single-piece construction or a multi-piece construction that includes a center and one or more outer core layers. Non-limiting examples of materials and compositions suitable for forming the core or one or more layers of the core are disclosed in the parent applications. Preferred compositions for solid cores include a base rubber (e.g., polybutadiene rubbers having a 1,4-cis content of at least about 40%), a crosslinking agent (e.g., ethylenically unsaturated acids having 3 to 8 carbon atoms and metal salts thereof), an initiator (e.g., peroxides, carbon-carbon initiators, and blends of two or more thereof) and, optionally, one or more additives (e.g., CoR enhancer like halogenated organosulfur compounds).

The golf ball core may have a diameter of 0.5 inches or greater, preferably 1 inch or greater, more preferably 1.5 inches or greater, further preferably 1.54 inches or greater, even preferably 1.545 inches or greater, most preferably 1.55 inches or greater, typically about 1.65 or less, or about 1.6 inches or less. The core may have an Atti compression of 20 to 120, preferably 30 to 100, more preferably 40 to 90, further preferably 45 to 85, further preferably 50 to 80, further preferably 50 to 75, even more preferably 50 to 65, most preferably 55 to 60; alternatively, the compression may be 25 or less, or 20 or less. The core may have a CoR of 0.7 or greater, preferably 0.75 or greater, more preferably 0.77 or greater, further preferably 0.79 or greater, even more preferably 0.8 or greater, and most preferably 0.81 or greater. The core may comprise a center and one or more outer core layers. The outer core layer may have a thickness of 0.5 inches or less, preferably 0.3 inches or less, more preferably 0.25 inches to 0.3 inches.

One, two, or more optional intermediate layers may be disposed between the core and the cover. The intermediate layer may be part of the core as an outer core layer, or part of the cover as an inner cover layer. In one example, an intermediate layer can be formed from a hard, high flexural modulus, resilient material which contributes to the low spin, distance characteristics when they are struck for long shots (e.g. driver or long irons). The material of the intermediate layer can have a Shore D hardness of 65-80, preferably 69-74, more preferably 70-72. The flexural modulus of the intermediate layer can be at least 65,000 psi, preferably from 70,000 psi to 120,000 psi, more preferably from 75,000 psi to 100,000 psi. The thickness of the inner cover layer may be from 0.020 inches to 0.045 inches, preferably from 0.030 inches to 0.040 inches. The intermediate layer preferably has a WVTR lower than that of the cover. More preferably, the WVTR of the intermediate layer is no greater than that of an ionomer resin such as Surlyn (,which is in the range of about 0.45 g/($m^2$ (day) to about 0.95 g/($m^2$ (day). Non-limiting examples of suitable materials and compositions that form the intermediate layers are disclosed in the parent applications.

The resultant golf balls typically have a CoR of about 0.7 or greater, preferably about 0.75 or greater, more preferably about 0.78 or greater, most preferably about 0.8 or greater. The golf balls also typically have an Atti compression of at least about 40, preferably from about 50 to 120, and more preferably from about 60 to 100. The golf balls typically have dimple coverage greater than about 60 percent, preferably greater than about 65 percent, and more preferably greater than about 75 percent. The diameter of the golf ball is preferably from 1.680 inches to 1.800 inches, more preferably from 1.680 inches to 1.760 inches, most preferably from 1.680 inches to 1.740 inches.

In one example, a golf ball cover layer is formed from a polyurethane elastomer, which is a reaction product of a prepolymer and a curative. The curative is 4,4'-bis(sec-butylamino)-dicyclohexylmethane. The prepolymer is formed from dicyclohexylmethane diisocyanate and a hydrogenated α,ω-dihydroxy polybutadiene having primary terminal hydroxyl groups, a polydispersity of 1.35, and a $M_n$ of 3,100. The cover layer has a material hardness of 47 Shore D and a moisture transmission of 0.0258 g/wk, in comparison with a conventional polyurethane cover layer having a moisture transmission of 0.3595 g/wk. The golf ball has a compression of 87. In another example, a golf ball having a polyurethane cover layer is formed using a composition disclosed herein. The prepolymer, having a % NCO of 8.5%, is formed from diphenylmethane diisocyanate and an α,ω-dihydroxy polybutadiene having a polydispersity of 1.35 or less. The curative is dimethylthiotoluene diamine. The cover layer has a moisture transmission of 0.054 g/wk, in comparison with a conventional polyurethane cover layer having a moisture transmission of 0.316 g/wk. In a further example, a golf ball having a polyurethane cover layer 0.04 inches thick disposed about a wound core of 1.6 inches in diameter is formed. The prepolymer, having a % NCO of 10.87%, is formed from dicyclohexylmethane diisocyanate and a hydrogenated polybutadiene polyol having a molecular weight of 3,000 to 4,000. The curative, used at an equivalent ratio of 1.02:1 to the prepolymer, is a hydrogenated polybutadiene polyol having a molecular weight of 3,000 to 4,000. The cover layer has a Shore D hardness of 33, a flexural modulus of 4,800 psi, and a moisture transmission of 0.0466 g/wk, in comparison to a conventional polyurethane cover having a moisture transmission of 0.3156 g/wk. The golf ball has a compression of 84, and a CoR of 0.778.

Golf balls of the present invention may have a variety of constructions, typically comprising at least a core and a cover. Optionally, one or more intermediate layers may be disposed between the core and the cover; the core may be a single solid mass, or include a solid, liquid-filled, gel-filled or gas-filled center and one or more outer core layers; and the cover may include an outer cover layer and one or more inner cover layers. Any of the outer core layers, the intermediate layers, or the inner cover layers may be a continuous layer, a discontinuous layer, a wound layer, a molded layer, a lattice network layer, a web or net, an adhesion or coupling layer, a barrier layer, a layer of uniformed or non-uniformed thickness, a layer having a plurality of discrete elements such as islands or protrusions, a solid layer, a metallic layer, a liquid-filled layer, a gas-filled layer, or a foamed layer.

The compositions for golf ball portions as disclosed herein may be used in sporting equipment in general. Specifically, the compositions may be applied in various game balls, golf club shafts, golf club head inserts, golf shoe components, and the like.

All patents and patent applications cited in the foregoing text are expressly incorporated herein by reference in their entirety.

The invention described and claimed herein is not to be limited in scope by the specific embodiments herein disclosed, since these embodiments are intended solely as illustrations of several aspects of the invention. Any equivalent embodiments and various modifications apparent to those skilled in the art are intended to be within the scope of this invention. It is further understood that the various features of the present invention can be used singly or in combination thereof. Such modifications and combinations are also intended to fall within the scope of the appended claims.

What is claimed is:

1. A golf ball comprising:
    a core, the core having a diameter of 1 inch or greater; and
    at least one layer disposed about the core, the layer having a thickness of 0.005 inches to 0.1 inches and being formed from a polyurea composition comprising an isocyanate-containing prepolymer formed from a polyisocyanate and a telechelic polyahl;
    wherein the prepolymer has a viscosity at room temperature of 200 Pa·s or less and a % NCO of 15% or less;
    wherein the telechelic polyahl has a polyhydrocarbon backbone that is free of aromatic unsaturations and free of hydrolysable moieties, and has a polydispersity of 1.35 or less; and
    wherein the telechelic polyahl is a homotelechelic polyahl having amine end groups.

2. The golf ball of claim 1, wherein the composition forms a a polyurea elastomer, and the telechelic polyahl forms soft segments in the elastomer.

3. The golf ball of claim 1, wherein the prepolymer further comprises a polyether polyahl or a polyester polyahl that is compatible with the telechelic polyahl.

4. The golf ball of claim 1, wherein the telechelic polyahl has a functionality of from 1.6 to 2.3.

* * * * *